US008788615B1

(12) United States Patent
Corbett et al.

(10) Patent No.: US 8,788,615 B1
(45) Date of Patent: Jul. 22, 2014

(54) SYSTEMS AND METHODS FOR CREATING AND USING ELECTRONIC CONTENT THAT REQUIRES A SHARED LIBRARY

(75) Inventors: James Corbett, Berkeley, CA (US); Jeffrey Kamerer, Columbus, OH (US)

(73) Assignee: Adobe Systems Incorporated, San Jose, CA (US)

( * ) Notice: Subject to any disclaimer, the term of this patent is extended or adjusted under 35 U.S.C. 154(b) by 909 days.

(21) Appl. No.: 12/572,673

(22) Filed: Oct. 2, 2009

(51) Int. Cl.
*G06F 15/16* (2006.01)
*G06F 13/00* (2006.01)
*G06F 9/445* (2006.01)

(52) U.S. Cl.
CPC . *G06F 13/00* (2013.01); *G06F 8/61* (2013.01)
USPC .......... 709/217; 709/203; 709/219; 386/278; 386/280; 386/281; 715/723; 715/738; 717/174; 717/175; 717/176; 717/177; 717/178

(58) Field of Classification Search
None
See application file for complete search history.

(56) References Cited

U.S. PATENT DOCUMENTS

| 5,640,320 | A  | * | 6/1997  | Jackson et al. ................. 700/87 |
|-----------|----|---|---------|----------------------------------------|
| 7,769,819 | B2 | * | 8/2010  | Lerman et al. ................. 709/217 |
| 7,817,900 | B2 | * | 10/2010 | Walker ........................... 386/278 |
| 7,895,261 | B2 | * | 2/2011  | Jones et al. ..................... 709/203 |
| 8,150,914 | B1 | * | 4/2012  | Taneja et al. ................... 709/203 |
| 8,306,396 | B2 | * | 11/2012 | Scherlis et al. ............... 386/278 |
| 8,600,220 | B2 | * | 12/2013 | Bloch et al. ..................... 386/296 |
| 2002/0124244 | A1 | * | 9/2002 | Skaringer et al. ............. 717/171 |
| 2003/0018609 | A1 | * | 1/2003 | Phillips et al. ..................... 707/1 |
| 2005/0160113 | A1 | * | 7/2005 | Sipusic et al. ............... 707/104.1 |
| 2005/0203927 | A1 | * | 9/2005 | Sull et al. ....................... 707/100 |
| 2006/0117305 | A1 | * | 6/2006 | Tarkkala ........................ 717/139 |
| 2007/0208438 | A1 | * | 9/2007 | El-Mankabady et al. ...... 700/83 |
| 2008/0044155 | A1 | * | 2/2008 | Kuspa .............................. 386/52 |
| 2008/0201332 | A1 | * | 8/2008 | Souders et al. .................. 707/10 |
| 2009/0013157 | A1 | * | 1/2009 | Beaule .......................... 712/225 |
| 2009/0019084 | A1 | * | 1/2009 | Crandall et al. ........... 707/104.1 |
| 2009/0106315 | A1 | * | 4/2009 | Upendran et al. ......... 707/104.1 |
| 2009/0144396 | A1 | * | 6/2009 | Walton .......................... 709/219 |
| 2009/0157743 | A1 | * | 6/2009 | Li ............................... 707/104.1 |
| 2009/0172400 | A1 | * | 7/2009 | Rave et al. ..................... 713/169 |
| 2010/0178024 | A1 | * | 7/2010 | Agarwal et al. ................. 386/52 |
| 2011/0026898 | A1 | * | 2/2011 | Lussier et al. ................. 386/280 |
| 2012/0226738 | A1 | * | 9/2012 | Taneja et al. .................. 709/203 |
| 2013/0259442 | A1 | * | 10/2013 | Bloch et al. .................... 386/230 |

OTHER PUBLICATIONS

'Introduction to Adobe Air' by Cesare Rocchi, Oct. 2, 2008.*

* cited by examiner

*Primary Examiner* — Steven Snyder
(74) *Attorney, Agent, or Firm* — Kilpatrick Townsend & Stockton LLP

(57) ABSTRACT

Systems and methods that provide electronic content that requires that the playing computing device download a shared library. Created electronic content can be combined into a package that includes logic to download the shared library, a piece of loading content, and the created electronic content. When the package is used on a computing device, the preloader downloads the shared library, the loading content plays while the shared library downloads, and the created electronic content plays after the shared library has finished downloading.

20 Claims, 4 Drawing Sheets

SYSTEMS AND METHODS FOR CREATING AND USING ELECTRONIC CONTENT THAT REQUIRES A SHARED LIBRARY

FIELD

This disclosure generally relates to computer software that creates, edits, runs, displays, provides, or otherwise uses electronic content.

BACKGROUND

Various content creation applications are used to create web pages, rich Internet applications (RIA), and other types of electronic content. Such electronic content can, in some instances, only be played on computing devices that have downloaded a shared library that provides features or functionality used by the content. For example, a piece of electronic content may use a graphic component that can only be displayed when played on a web browser or RIA using code provided in such a shared library. Moreover, a shared library generally needs to be downloaded prior to launching a piece of electronic content because it is generally impossible to determine whether the shared library will be required for the first state, frame, or scene of the electronic content.

In circumstances in which electronic content requires downloading a shared library, content creators have typically been required to write custom code to accomplish such downloading. Certain content creation applications have provided some rudimentary facilities to help content creators in this regard. In some content creation environments, a tag or other feature can be used to block everything else from happening in a piece of electronic content while something is downloading. Such features, however, block everything and thus restrict or even prevent a content creator from specifying a loading animation or other initial content to be played during the download.

The problems associated with facilitating a content creator's ability to use features that require downloading a shared library are particularly significant for content creation applications that give a content creator significant flexibility with respect to the timeline/frames of the electronic content. In such applications, it may be desirable to make all frames of the timeline available for content creator use, meaning that the content creation application cannot reserve any frames for downloading the shared library. Generally, existing content creation applications do not adequately allow flexible content creation in which users have significant control over timeline or other features while being able to use features from a shared library. Existing content creation applications also do not adequately allow content creators to configure asynchronous shared library downloading with minimal or no coding and/or to use a loading animation or other loading content that plays while a shared library is downloaded.

SUMMARY

Systems and methods are disclosed that provide electronic content that requires that the playing computing device download a shared library. Created electronic content can be combined into a package that includes logic to download the shared library, such logic referred to generally herein as a "preloader," a piece of loading content, and the created electronic content. When the package is used on a computing device, the preloader downloads the shared library, the loading content plays while the shared library downloads, and the created electronic content plays after the shared library has finished downloading.

One exemplary embodiment comprises a method of creating electronic content that can use a shared library. This exemplary method involves providing a user interface for creating electronic content. The user interface has a canvas or editing area for displaying objects used in electronic content being created, tools for editing the appearance and functionality of the objects, and a timeline tool for defining movement or interactivity of the objects, wherein electronic content that is created comprises one or more frames defined using the timeline tool. The method involves receiving input to create a file comprising the electronic content and determining whether the electronic content requires accessing a shared library and, if it does, providing the files as a package. The package has a preloader, a first piece of electronic content, and a second piece of electronic content. When the package is used on a computing device, the preloader downloads the shared library, the first piece of electronic content plays while the shared library downloads, and the second piece of electronic content (corresponding to electronic content that was developed on the user interface) plays after the shared library has finished downloading.

Another exemplary embodiment comprises a method of playing electronic content that requires downloading a shared library. This exemplary method involves receiving a package of one or more files comprising a preloader, a first piece of electronic content, and a second piece of electronic content. The second piece of electronic content comprises a plurality of frames. The second piece of electronic content may have been created by a content creation application that allows the user (i.e., content creator) control of any frame. The method also involves, in response to the preloader, downloading a shared library necessary for use of the second piece of electronic content, and playing the first piece of electronic content while the shared library downloads. After the shared library has finished downloading, the second piece of electronic content is played.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Electronic content may require that the playing computing device download a shared library. A content creation application can allow and facilitate creation of this type of content, including content in which the content creator is able to control all of the interactivity, events, and other timing events of the content, i.e., an environment in which the content creator is given essentially complete control over the content's timeline(s). The content creation application can allow the content creator to create content using various tools for adding objects, functionality, and other features to the content.

In certain embodiments, a content creator does not need to be concerned with whether any of those features will require that that playing device download a shared library because the content creation application recognizes the use of any feature with such a requirement and facilitates any necessary downloading. For example, a content creation application may inject the necessary downloading logic by combining the created electronic content into a package that includes logic to download the shared library, i.e., a "preloader," a piece of loading content, and the created electronic content. The content creation application can facilitate the creation of the piece of loading content, such as a loading animation, or can supply default loading content. When the package is used on a computing device, the preloader downloads the shared library, the loading content plays while the shared library downloads, and the created electronic content plays after the shared library has finished downloading.

Exemplary systems and methods disclosed herein can provide numerous benefits and are generally applicable, as examples, in circumstances in which a content creator is creating timeline-based content, content involving an animation, and/or content that requires preloading or other asynchronous downloading, among other circumstances. A content creator may be able to implement electronic content writing minimal or no code, while having an option to enhance or customize the content by writing code. A shared library can be provided as a special signed library that can be cached so that once it is downloaded, it will not need to be downloaded again regardless of the domain providing the electronic content that requires the shared library.

These illustrative examples are given to introduce the reader to the general subject matter discussed herein and are not intended to limit the scope of the disclosed concepts. The following sections describe various additional embodiments and examples.

Illustrative Computing Environment

Figure 1:
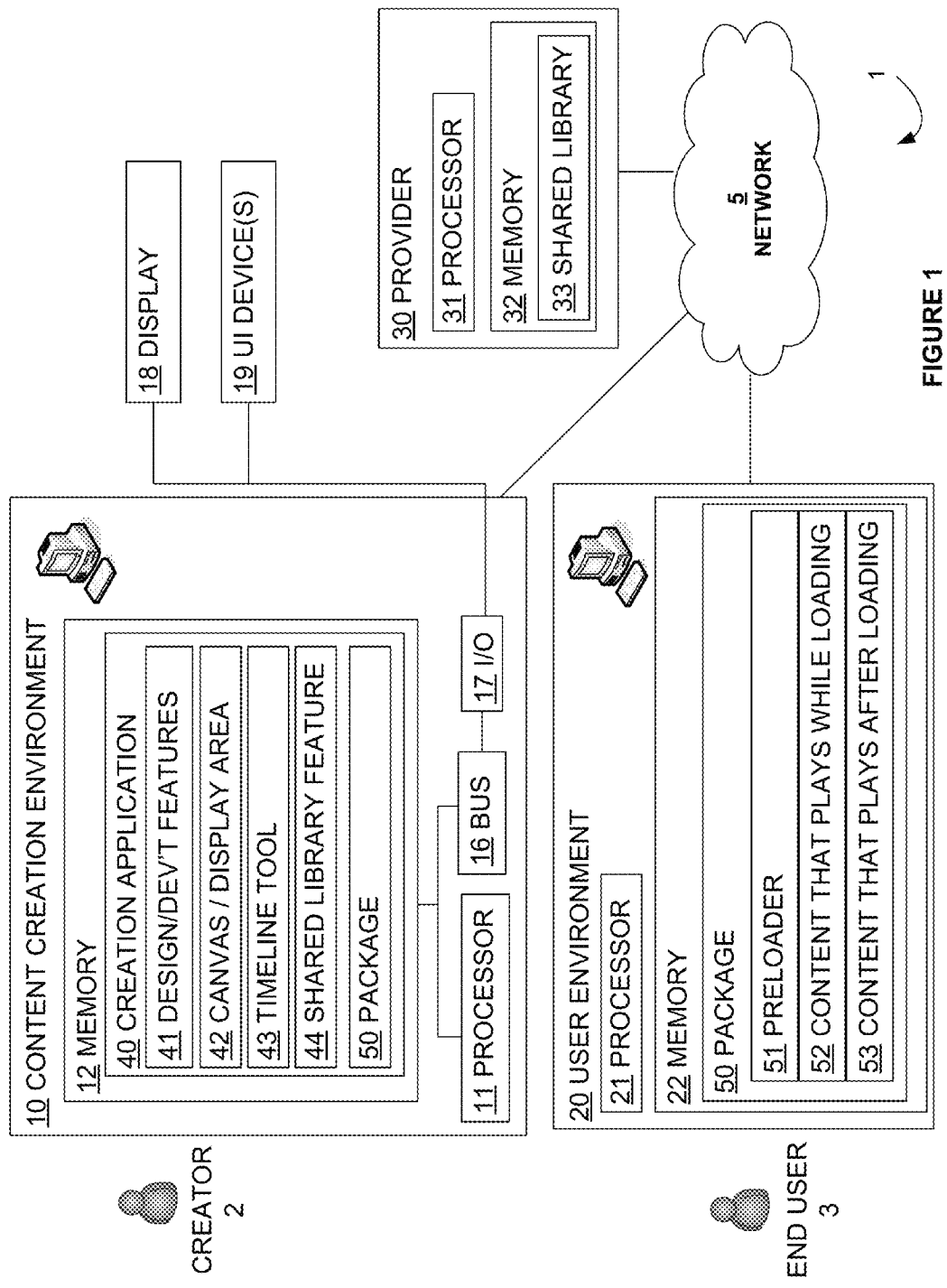
FIG. 1 is a system diagram illustrating an exemplary computing environment.

Referring now to the drawings in which like numerals indicate like elements throughout the several Figures, FIG. 1 is a system diagram illustrating an exemplary computing environment. Other computing environments may be also be used. The environment 1 shown in FIG. 1 comprises a wired or wireless network 5 connecting various network devices 10, 20, 30. Exemplary applications that execute on each of the devices 10, 20, 30 are shown as functional or storage components residing in memory 12, 22, 32 on the respective devices. The memory 12, 22, 32 may be transient or persistent. As is known to one of skill in the art, such applications may be resident in any suitable computer-readable medium and execute on any suitable processor. For example, the network devices 10, 20, 30 shown each may comprise a computer-readable medium such as a random access memory (RAM) 12, 22, 32 coupled to a processor 11, 21, 31 that executes computer-executable program instructions and/or accesses information stored in memory 12, 22, 32. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 5 shown comprises the Internet. In other embodiments, other networks, intranets, combinations of networks, or no network may be used. The devices 10, 20, 30 can be connected to a network 5 as shown. Alternative configurations are of course possible. The devices 10, 20, 30 may also comprise a number of external or internal devices such as a mouse, a CD-ROM, DVD, a keyboard, a display, audio speakers, or other input or output devices. For example, content creation environment 10 includes a display 18 and various user interface devices 19. A bus, such as bus 16, will typically be included in each of the computing devices 10, 20, 30. Exemplary provider 30 can be implemented on a server device. Examples of a server device are servers, mainframe computers, networked computers, a processor-based device, and similar types of systems and devices.

Content creation environment 10 includes a content creation application 40 for a creator 2 to create and edit electronic content. The creation application 40 may include various design and development features 41, a canvas or editing area 42, and a timeline tool 43. A creator 2 may position various graphically-displayed objects on the canvas or editing area 42 to specify the appearance of the application or other content that is being created. The design and development features 41 may be used to edit and configure these graphically-displayed objects and to add functionality, animation, and event-based interactivity to those objects. The timeline tool 43 may be used to further develop time-aspects of content being developed including the functionality, animation, and event-based interactivity, and may allow a creator to work with one or more frames at various times along a timeline to create and edit such features. As one example, an animation may be imported and automatically (or based on creator interactions) associated with a timeline. Certain images of the animation can, for example, be associated with certain frames of the timeline.

The content creation environment 10 can generally be used to create electronic content that is provided for use by end users. The content creation environment 10 may provide a shared library 44 feature that analyzes content that is being developed to determine whether such content requires that a content player playing the content have access to features provided from something outside of the content itself, such as, features provided by a shared library. If a shared library needs to be downloaded and used by a content player playing content being created, the content creation environment 10 may create a package 50 that includes a preloader 51, content that plays while loading 52, and content that plays after loading 53.

For example, a package may be received at user environment 20 and used by end user 3. The user environment may or may not include a separate application such as a content player (not shown) that plays or uses one or more aspects of the package. When the package is used on the user environment, if one or more necessary shared libraries are not present, the preloader causes those libraries to be downloaded. The preloader 50 may cause a shared library 33, for example, to be downloaded from a provider 30 through network 5. While the download occurs, the user environment plays the content that plays while loading 52, which may be, as examples, a user defined loading animation or a default piece of loading content. After the download occurs, the user environment plays the content that plays after loading 53, which can correspond to the content that was created as a piece of content by creator 2 using the design and development features 41, canvas or editing area 42, timeline tool 43, and/or other features of the creation application 40.

Figure 2:
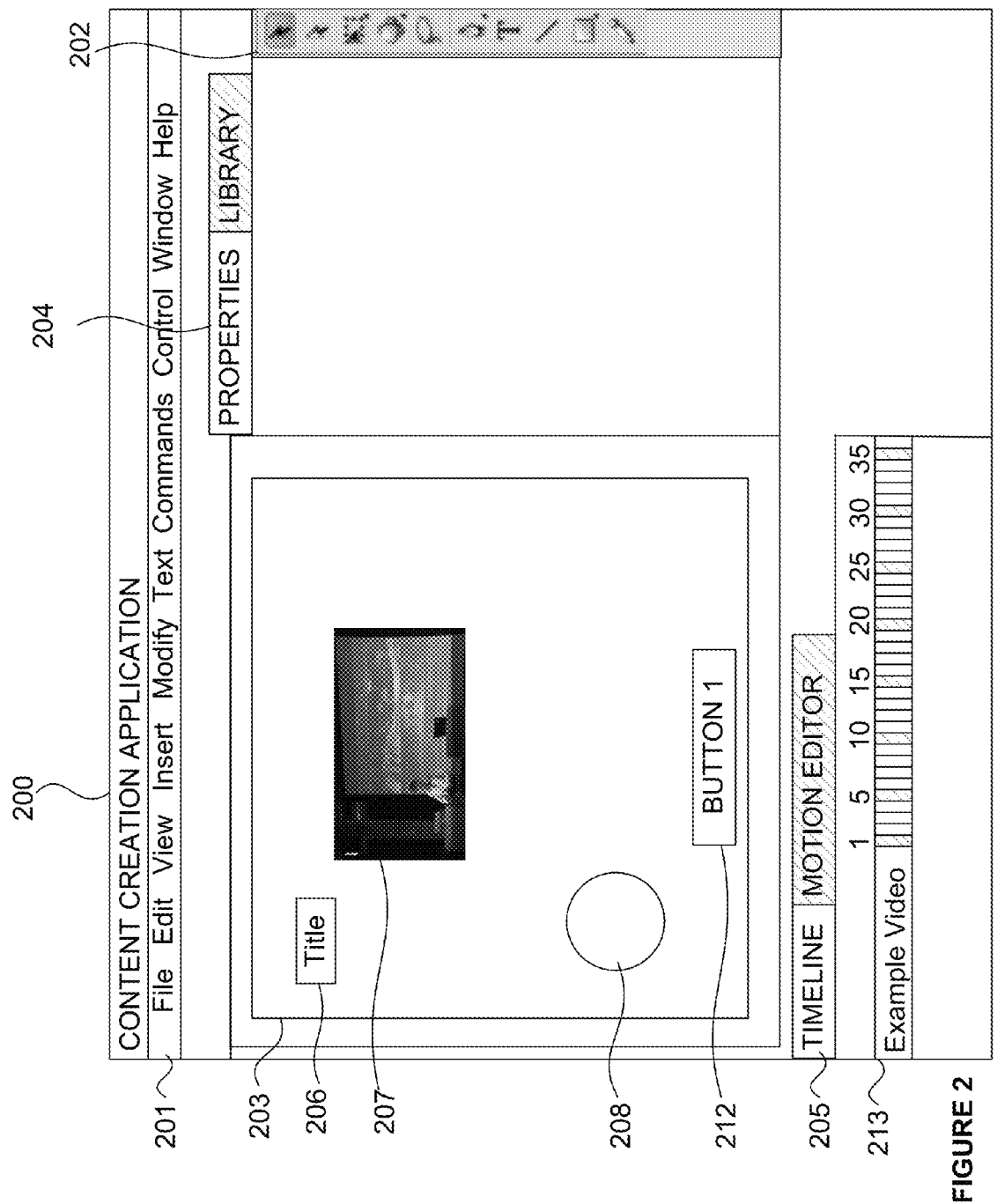
FIG. 2 is an illustration of a user interface of an exemplary content creation software application according to certain embodiments.

FIG. 2 is an illustration of a user interface of an exemplary content creation software application according to certain embodiments. The user interface 200 includes a basic menu 201, an editing menu 202, an editing canvas 203, a properties area 204, and a timeline area 205. The canvas displays a title object 206, a video object 207, an animated circle object 208, and a button object 212. In this example, the editing menu 202 includes various selection, text, and drawing tools that a content creator can use to add and edit objects on the canvas 203. Generally, a content creation environment may include various menus of tools or other features for editing the content, e.g., to fill in the color of a region, draw a line, and add functionality, animation, and event-based activity in such a menu or otherwise. The timeline 213 displays information about frames that can be used to define functionality, animation, and event-based activity. Generally, the user interface 200 of a content creation application can provide a creator a significant amount of flexibility with respect to using timelines and frames within content being developed. A user interface 200 may allow creator control of any frame of any timeline associated with a piece of content being developed.

The exemplary configuration and uses of this exemplary computing environment are provided merely to illustrate various potential configurations that can be used to implement certain embodiments. Other configurations may of course be utilized.

Exemplary Methods of Creating Electronic Content

Figure 3:
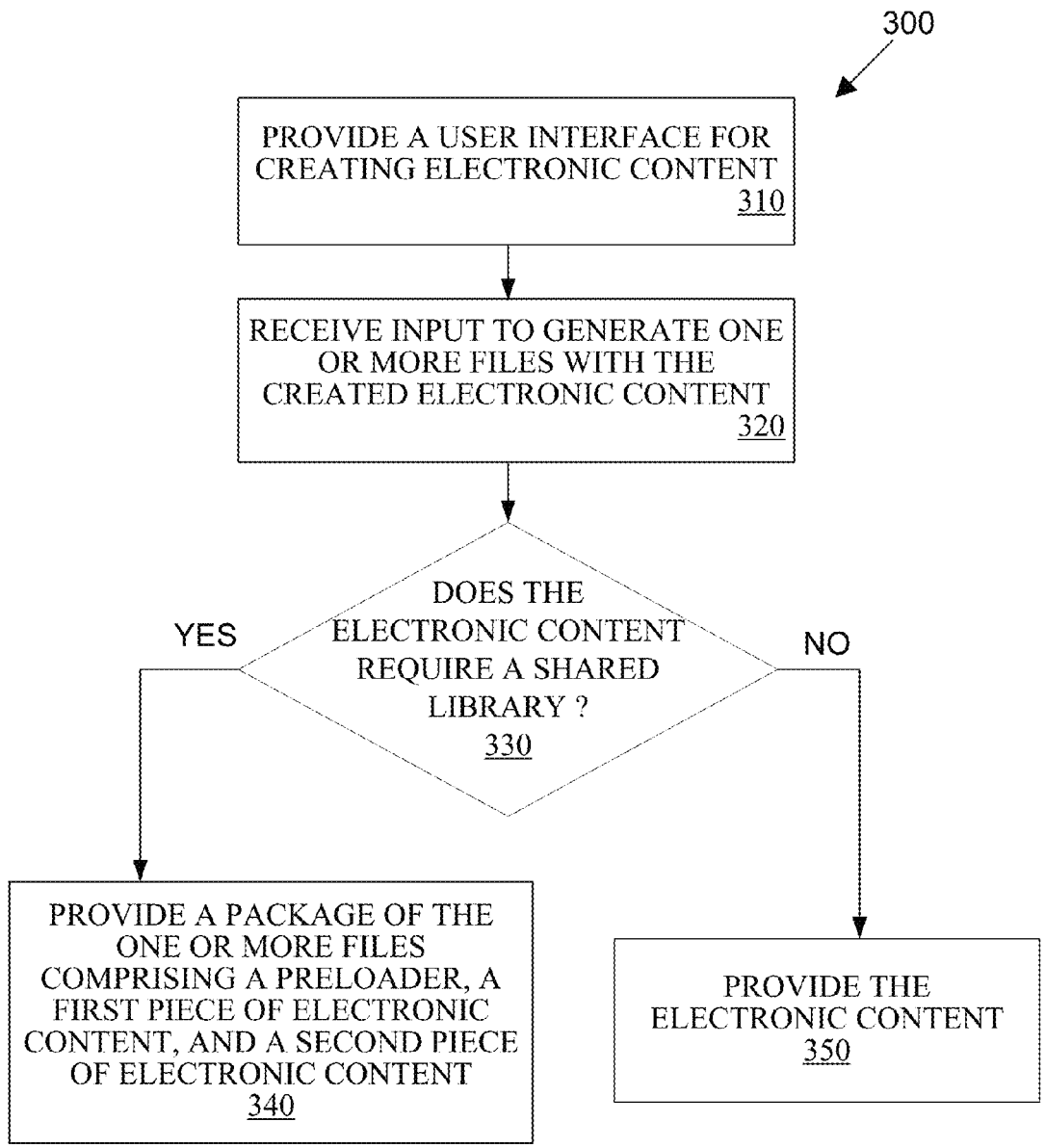
FIG. 3 is a flow chart illustrating an exemplary method of creating electronic content that requires the download of a shared library.

FIG. 3 is a flow chart illustrating an exemplary method 300 of creating electronic content that requires the download of a shared library. Method 300 can be performed in a variety of computing environments and is typically performed in a content creation application or other environment in which a creator is defining content that is being created or edited, such as content creation environment 10 of FIG. 1. The method 300 involves providing a user interface for creating electronic content, as shown in block 310. The user interface comprises a canvas or editing area for displaying objects used in electronic content being created, tools for editing the appearance and functionality of the objects, and a timeline tool for defining movement or interactivity of the objects. Electronic content is created and has one or more frames defined using the timeline tool. The user interface may allow user control (i.e., content creator control) of any frame of any timeline associated with the second piece of content.

The exemplary method 300 further involves receiving input to create one or more files with the created electronic content, as shown in block 320. For example, this may involve receiving a key stroke combination, a command identified in a drop down menu, or receiving a selection of a tool on a tool menu. Creating the one or more files can be performed to make the electronic content available for end users. For example, content may be saved, published, or converted to a format useable on an end user computing device with a content player application.

The exemplary method 300 further involves determining whether the electronic content requires accessing a shared library, as shown in decision block 330. Such determination can occur on an ongoing basis as the content creator interacts with the content creation environment or can occur in response to receiving a command or input to create the one or more files, e.g., a command to publish content. In one embodiment, whenever a content creator accesses a feature that requires a library then the content creation environment automatically proceeds with implementing preloading code for use in the one or more files that will ultimately be published to end users. If accessing a shared library is not required, the method 300 simply proceeds to provide the electronic content, as shown in block 350.

If accessing a shared library is required, the method 300 involves providing a package of the one or more files comprising: a preloader; a first piece of electronic content; and a second piece of electronic content, as shown in block 340. The first piece of content may be a default, user-defined, or user-selected piece of content that plays while the shared library is downloaded. For example, the user interface of a content creation application may receive input from a content creator to create a particular loading animation that will be played while the shared library download occurs. Such a loading animation may display a progress indicator indicating the progress of the downloading of the shared library. The second piece of electronic content corresponds to the main or principle electronic content that was developed on the user interface. Accordingly, when the package is used on a computing device, the preloader downloads the shared library, the first piece of electronic content plays while the shared library downloads, and the second piece of electronic content plays after the shared library has finished downloading.

The package may have a single file that embeds as binary data both the first content and the second content. Thus, in an example, both a loading animation and creator-created animation are embedded as bytes—such that they can be loaded directly from within a single file. In an exemplary embodiment, a load command may be used to load byte arrays associated with the binary data. This can facilitate faster loading and can avoid potential delay associated with requesting one or more additional files through a network or otherwise.

In another embodiment, the package has multiple files, for example, having one file associated with the preloader, a second file associated with the first piece of content, and a third file associated with the second piece of content. A preloading script may first request the preloader animation, which could be external to the preloader, and then the main content, which could also be external to the preloader.

In another exemplary embodiment, the shared library may comprise a signature or indication from a trusted source that the shared library can be trusted. The signature or indication can be used, by a content playing application for example, to determine whether a shared library can be downloaded once and used from different domains.

In another exemplary embodiment, the package comprises a package timeline. The first piece of electronic content on a frame of the package timeline and the second piece of electronic content is on the another frame of the package timeline. This package timeline can be used to organize the playing of the different pieces of content at their appropriate times.

In another embodiment, a content creation environment provides an option to avoid the automatic creation of a package and instead allows a content creator to manually instrument preloading within content that is being developed. A creator can implement preloading using their own content's timeline, for example, by creating a first frame specifically for downloading any necessary libraries and playing loading animation. Such implementation can be facilitated by the content creation application, which may provide easily-implemented features for adding such functionality and make available events upon which such functionality can be based. For example, code may be generated and put on a first frame and a content creator may simply set up listeners or other functionality that recognizes an event that indicates that everything necessary has been loaded as a bases for exiting the preloader. This type of creator control may be useful, for example, in the creation of traditional animation in which it may be important to stream the animation. Another option may be provided to avoid loading features from a shared library altogether and instead simply build some or all of a library into the created content itself.

Exemplary Methods of Creating Electronic Content

Figure 4:
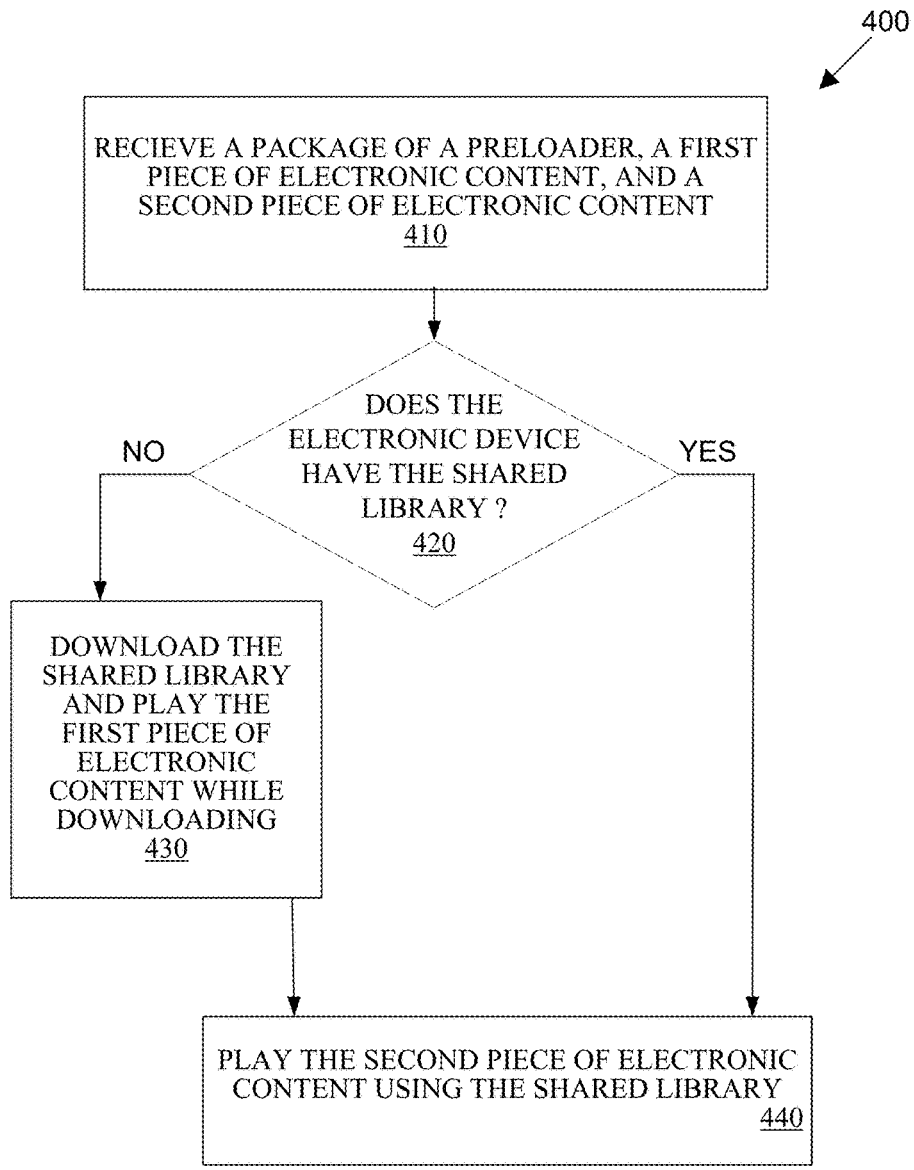
FIG. 4 is a flow chart illustrating an exemplary method of receiving and playing electronic content that requires the download of a shared library.

FIG. 4 is a flow chart illustrating an exemplary method of receiving and playing electronic content that requires the download of a shared library. Such a method and similar methods may be implemented in a variety of computing environments including an end user computer, such as user environment 20 of FIG. 1. The exemplary method 400 involves receiving a package of one or more files comprising a preloader; a first piece of electronic content; and a second piece of electronic content, as shown in block 410. The second piece of electronic content comprises a plurality of frames which, on the content creation application, a content creator had control over. Because the content creation application allows user (i.e., content creator) control of any frame, the preloading logic and loading content is provided separate from the created content, i.e., the preloader and first piece of content are separated from the second piece of content, but packaged for use with the second piece of content to ensure that devices playing the second piece of content have any necessary shared libraries.

The package may have a single file that embeds as binary data both the first content and the second content, and, in response to receiving the package, byte arrays associated with the binary data may be loaded. In one embodiment, a package comprises a package timeline that is used to implement the preloading, playing of the first piece of content, and playing of the second piece of content at appropriate respective times, i.e., so that the first piece of content plays while the preloader downloads a shared library, and the second piece of content plays at some point in time after the shared library has finished downloading.

The exemplary method 400 further involves determining whether the electronic device that received the package has a shared library, as shown in block 420. This determination may be made according to instructions provided by the package preloader. If the electronic device already has the shared library, the method proceeds to play the second piece of electronic content using the shared library, as shown in block 440.

If the electronic device does not already have the shared library, the method 400 further involves downloading the shared library and playing the first piece of electronic content while downloading, as shown in block 430. After the shared library has been downloaded, the second piece of electronic content is played and can utilize the shared library which is now downloaded, i.e., the method 400 proceeds to block 440. In one exemplary embodiment, downloading the shared library and playing the first piece of content begin prior to receiving all of the second piece of content. In other words, the package need not be received in its entirety prior to the user device using any already received portions of the package.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing a user interface in a content creation environment for creating electronic content for display in a user environment, the user interface provided by a processor processing instructions stored on a computer-readable medium, the user interface comprising: an editing area for displaying objects used in creation of electronic content; tools for editing the appearance or functionality of the objects; and a timeline tool for defining movement or interactivity of the objects, wherein electronic content that is created comprises one or more frames defined using the timeline tool;
receiving input to create one or more files comprising the electronic content; and
determining whether the electronic content requires for display accessing a shared library and, if accessing a shared library is required, providing a package for use in the user environment of the one or more files comprising: a preloader; a first piece of electronic content; and a second piece of electronic content corresponding to electronic content being developed on the user interface;
wherein, when the package is used in the user environment separate from the content creation environment, the preloader downloads the shared library, the first piece of electronic content plays while the shared library downloads, and the second piece of electronic content plays after the shared library has finished downloading.

2. The method of claim 1 wherein the user interface allows control of any frame of any timeline associated with the second piece of content.

3. The method of claim 1 wherein the package of one or more files has a single file that embeds as binary data both the first content and the second content.

4. The method of claim 3 wherein a load command is used to load byte arrays associated with the binary data.

5. The method of claim 3 wherein the package comprises a package timeline, wherein the preloader is on a first frame of the package timeline, the first piece of electronic content is on a second frame of the package timeline, and the second piece of electronic content is on the third frame of the package timeline.

6. The method of claim 1 wherein the shared library comprises a signature or indication from a trusted source that the library can be trusted, wherein a shared library can be downloaded once and used from different domains.

7. The method of claim 1 wherein the package of one or more files has multiple files, one of the multiple files associated with the first content and another of the multiple files associated with the second content.

8. The method of claim 1 further comprising receiving input to create a loading animation used as the first piece of content.

9. The method of claim 1 further the first piece of content is a loading animation, wherein the loading animation indicates progress of the downloading of the shared library.

10. A computer-implemented method comprising:
receiving, at a processor, a package of one or more files comprising a preloader;
a first piece of electronic content; and a second piece of electronic content for use in a user environment;

in response to the preloader, downloading, by the processor, a shared library necessary for use of the second piece of electronic content;

playing, by the processor, the first piece of electronic content in the user environment separate from a content creation environment while the shared library downloads; and after the shared library has finished downloading, playing, by the processor, the second piece of electronic content, wherein the second piece of electronic content comprises a plurality of frames, the second piece of electronic content created by a content creation application that allows control of any frame via a user interface in the content creation environment.

11. The method of claim 10 wherein the package of one or more files has a single file that embeds as binary data both the first content and the second content, wherein, in response, to receiving the package, byte arrays associated with the binary data are loaded.

12. The method of claim 10 wherein the package comprises a package timeline, wherein the preloader is on a first frame of the package timeline, the first piece of electronic content is on a second frame of the package timeline, and the second piece of electronic content is on the third frame of the package timeline.

13. The method of claim 12 wherein downloading the shared library and playing the first piece of content begin prior to receiving all of the second piece of content.

14. The method of claim 10 wherein the shared library comprises a signature or indication from a trusted source that the library can be trusted, wherein a shared library can be downloaded once and used from different domains.

15. The method of claim 10 wherein the package of one or more files has multiple files, a first of the multiple files containing the preloader, a second of the multiple files containing the first piece of content, and a third of the multiple files containing the second piece of content.

16. A computer apparatus comprising:

a user interface in a content creation environment for creating electronic content for use in a user environment, the user interface provided by a processor processing instructions stored on a computer-readable medium, the user interface comprising an editing area for displaying objects used in creation of electronic content and the user interface comprising tools for editing the appearance or functionality of the objects; and a first component implemented by the processor processing instructions stored on the computer-readable medium, wherein the first component:

receives input to create one or more files comprising the electronic content; and determines whether the electronic content requires accessing a shared library and, if accessing a shared library is required, provides a package for use in the user environment of the one or more files comprising: a preloader; a first piece of electronic content; and a second piece of electronic content corresponding to electronic content being developed on the user interface; and wherein, when the package is used in the user environment separate from the content creation environment, the preloader downloads the shared library, the first piece of electronic content plays while the shared library downloads, and the second piece of electronic content plays after the shared library has finished downloading.

17. The computer apparatus of claim 16 wherein the user interface allows control of any frame of any timeline associated with the second piece of content.

18. The computer apparatus of claim 16 wherein the package of one or more files has a single file that embeds as binary data both the first content and the second content.

19. A non-transitory computer-readable medium on which is encoded program code, the program code comprising:

program code for providing a user interface in a content creation environment for creating electronic content for use in a user environment, the user interface provided by a processor processing instructions stored on a computer-readable medium, the user interface comprising: an editing area for displaying objects used in electronic content being created; tools for editing the appearance and functionality of the objects; and a timeline tool for defining movement or interactivity of the objects, wherein electronic content that is created comprises one or more frames defined using the timeline tool;

program code for receiving input to create one or more files comprising the electronic content;

program code for determining whether the electronic content requires accessing a shared library and, if accessing a shared library is required, providing a package for use in the user environment of the one or more files comprising: a preloader; a first piece of electronic content; and a second piece of electronic content corresponding to electronic content being developed on the user interface, wherein, when the package is used in the user environment separate from the content creation environment, the preloader downloads the shared library, the first piece of electronic content plays while the shared library downloads, and the second piece of electronic content plays after the shared library has finished downloading.

20. The computer-readable medium of claim 19 wherein the user interface allows control of any frame of any timeline associated with the second piece of content.

* * * * *